April 30, 1935.  C. L. BRYANT  1,999,171
PROTECTIVE DEVICE FOR AUTOMOBILES
Filed Dec. 5, 1933   4 Sheets-Sheet 4
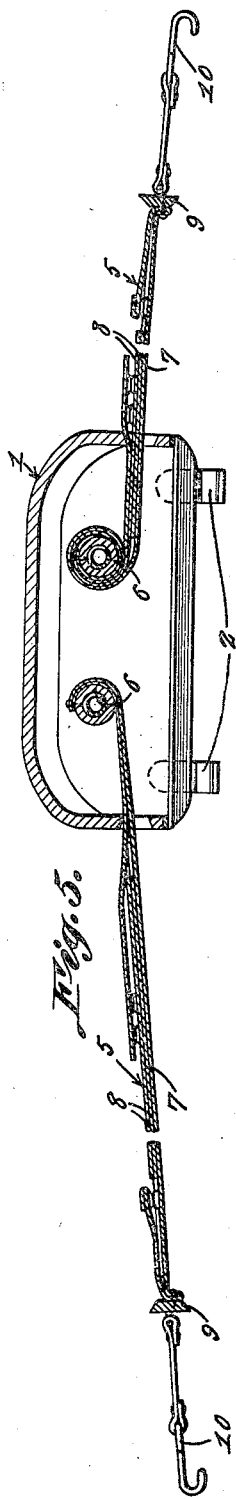
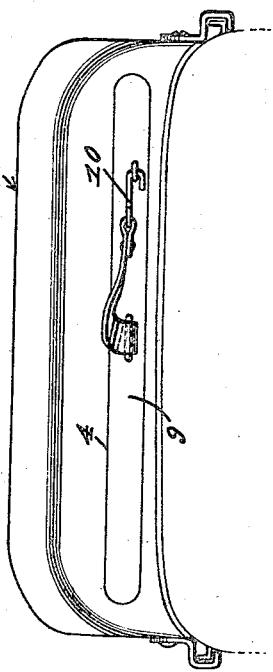
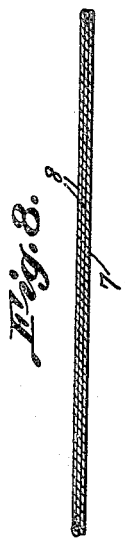
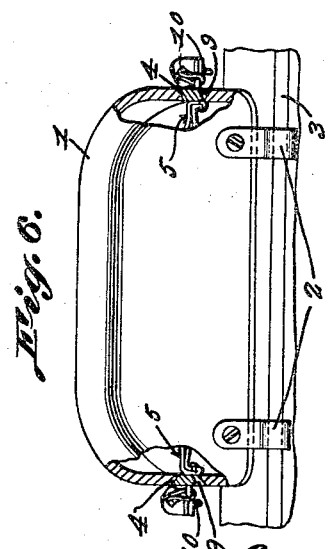
Curtis L. Bryant,
INVENTOR
BY Victor J. Evans & Co.
ATTORNEY Patented Apr. 30, 1935

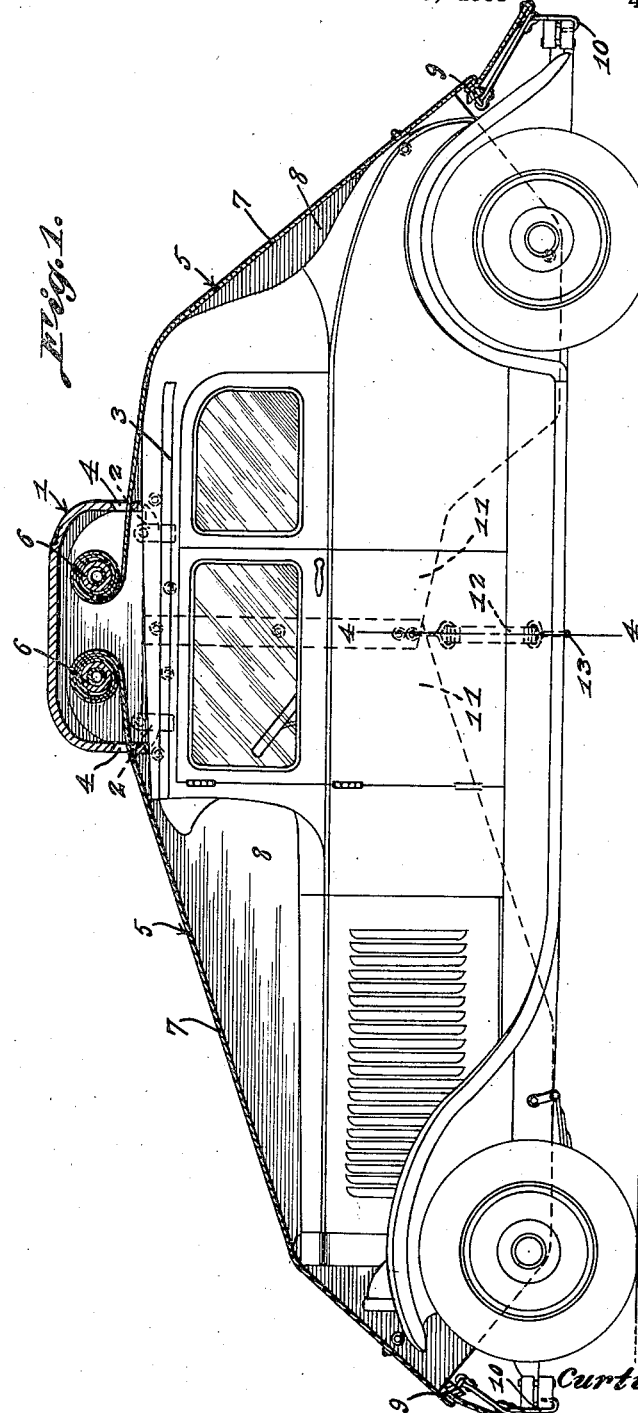

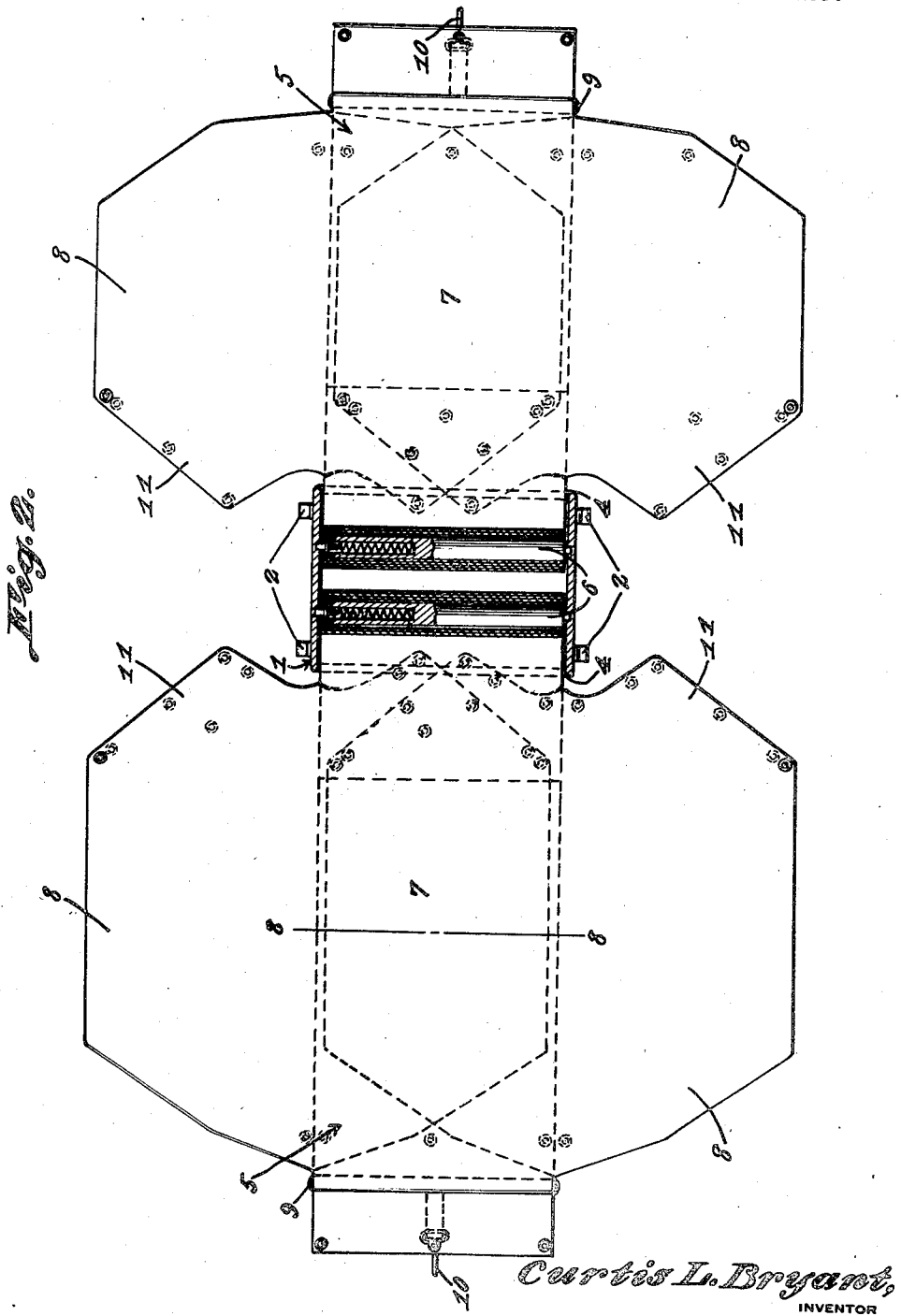

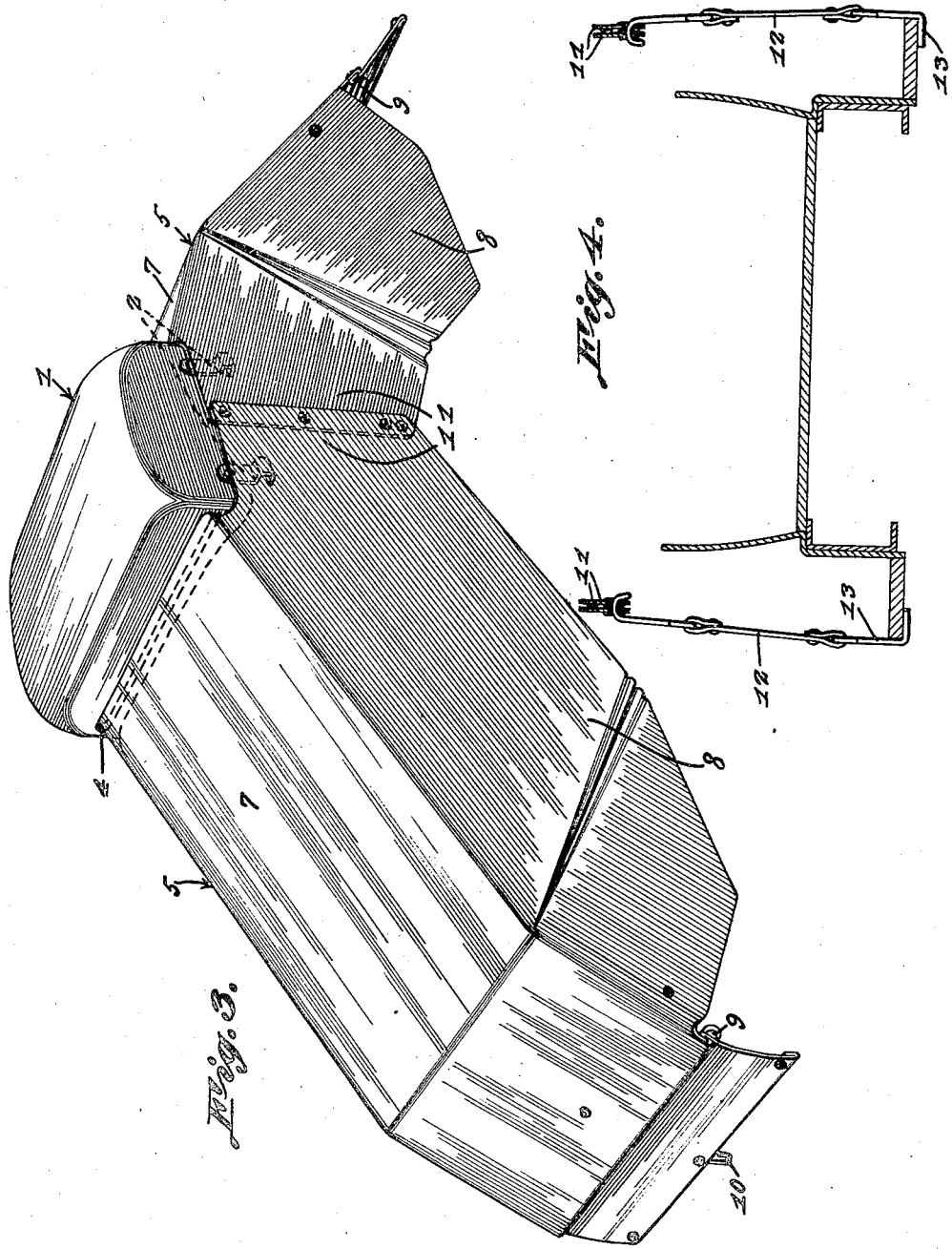

1,999,171

UNITED STATES PATENT OFFICE 1,999,171

PROTECTIVE DEVICE FOR AUTOMOBILES

Curtis L. Bryant, Camden, Ark.

Application December 5, 1933, Serial No. 701,074

1 Claim. (Cl. 135—5)

This invention relates to protective devices for automobiles and has for the primary object the provision of a device which may be easily and quickly mounted to an automobile body whereby the latter may be entirely covered and uncovered and is so constructed that when positioned to expose or uncover the body will provide a compact device which may remain attached to the automobile during the use of the latter and when positioned to cover the body will efficiently protect the latter against weather elements and dirt.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating an automobile with a protective device applied thereto and constructed in accordance with my invention.

Figure 2 is a plan view partly in section showing the folding and unfolding of the cover elements of the device.

Figure 3 is a perspective view illustrating the protective device in an operative position.

Figure 4 is a sectional view taken on the line 4—4 of Figure 1.

Figure 5 is a sectional view showing the cover elements folded for positioning within the housing of the device.

Figure 6 is a side elevation partly in section illustrating the housing of the device and the means of connecting the same to the automobile body.

Figure 7 is an end elevation illustrating the device with the cover elements confined within the housing.

Figure 8 is a sectional view taken on the line 8—8 of Figure 2.

Referring in detail to the drawings, the numeral 1 indicates a housing especially designed to be mounted on the top or roof of an automobile and the sides thereof carry securing elements 2 to slidably engage the gutters 3 of the automobile. The bottom wall of the housing is curved to conform to the contour of the top of the automobile while the general outline of the housing is such as to harmonize with the design of the automobile. By sliding the housing endwise with respect to the automobile it may be applied and removed from the top of said automobile. Opposite walls of the housing are provided with slots or entrances 4 through which operate cover elements 5. The cover elements are mounted to self-winding rollers 6 of the spring type suitably mounted within the housing so that during non-use of the device the cover elements may be wound upon the rollers and confined within the housing providing a compact device which may be easily handled during the application and removal of the device to the automobile or may be allowed to remain attached to the automobile during the use of the latter.

Each cover element is constructed from a suitable waterproof material and includes a main strip 7 carrying side flaps 8. The flaps 8 terminate short of the free end of the main strip 7 and said end of the latter has secured thereto a member 9 to which is connected hook elements 10. The hook elements engage the bumpers of the automobile for the purpose of retaining the cover elements outwardly of the housing 1 and overlying the body of the automobile. The other ends of the flaps are cut to form extensions 11 equipped with separable fasteners so that the extensions may be detachably connected for holding the flaps 8 in position at the sides of the body of the automobile. The extensions 11 also have connected thereto anchoring straps 12 provided with hooks 13 to engage under the running boards of the automobile. The straps 12 are detachable from the extensions 11 of the flaps. The cover elements when extended and connected to the bumpers of the automobile and the flaps joined together and connected with the running boards efficiently cover the entire body of the automobile so as to protect the latter from weather elements and dirt.

To uncover the automobile, the flaps are freed from the running board and detached from each other and then folded over the main strips 7. The main strips 7 are then free to wind onto the rollers when freed from the bumpers, the members 9 engaging with the slotted walls of the housing to limit the winding of the cover elements onto their respective rollers leaving exposed or located exteriorly of the housing the hooks 10 which may be readily grasped for drawing the cover elements outwardly of the housing when again desiring to cover the automobile.

While I have shown and described the preferred embodiment of my invention, it will be understood that minor changes in construction, combination and arrangement of parts may be made without departing from the spirit and scope of my invention, as claimed.

Having described the invention, I claim:

A protective device for automobiles comprising a housing mounted on the top of an automobile and having entrances positioned towards the front and rear of the automobile, self-winding rollers in the housing, cover elements carried by said rollers and fed outwardly of the housing by way of the entrances and each including a main strip and side flaps, means for detachably connecting the main strips to the front and rear bumpers of the automobile, means for connecting the flaps in pairs at the side of the automobile with the lower edges of the flaps spaced above the ground, and fasteners detachably securing the connected flaps to the running boards of the automobile.

CURTIS L. BRYANT.